UNITED STATES PATENT OFFICE 2,593,267

ORGANOTIN COMPOUNDS AND COMPOSITIONS CONTAINING THE SAME

James M. Church, Tenafly, Ernest W. Johnson, Mountainside, and Hugh E. Ramsden, Metuchen, N. J., assignors to Metal & Thermit Corporation, New York, N. Y., a corporation of New Jersey No Drawing. Application May 3, 1951,
Serial No. 224,448

13 Claims. (Cl. 260—45.75)

This invention relates to new organotin compounds and to compositions incorporating the new compounds, such compositions being themselves new and useful and serving to illustrate one of the uses for the compounds.

The compounds comprise the reaction product of an organotin oxide with an aldehyde. In such a reaction, while an organotin compound may be reacted with an aldehyde to give a particular species of product, in general the reaction is considered as an overall one made up of a number of reactions occurring simultaneously so that the product recovered is a mixture of many species. Each of these species may be represented by the formula

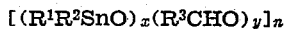

$$[(R^1R^2SnO)_x(R^3CHO)_y]_n$$

in which $R^1$, $R^2$ and $R^3$ are radicals selected from the group consisting of substituted and unsubstituted alkyl, aralkyl, alkenyl, alkynyl, aryl and heterocyclic radicals and $x$, $y$ and $n$ are whole numbers. The portion of the formula $R^1R^2SnO$ represents the composition of the starting organotin oxide and is the same in each of the species of product obtained in a given overall reaction. The $R^3CHO$ moiety may represent the starting aldehyde, or the products of its self-condensation which are themselves aldehydes; thus, in the product mixture of a given overall reaction, one species may have the starting aldehyde as its $R^3CHO$ moiety; another species may have a condensed aldehyde, that is, a condensation product of the starting aldehyde, as the $R^3CHO$ moiety; another species may have a different condensed aldehyde as the $R^3CHO$ moiety; and so on. As will be realized, many aldehyde condensation products or moieties are possible. In addition, other species may have several of the foregoing aldehyde types as the $R^3CHO$ moiety. The statistical average value of $x$ for the mixture lies between 1 and 10, while the corresponding average value of $y$ lies between 1 and 6. The value for $n$ may lie between 1 and about 7.

The physical properties of the compounds, particularly their melting points and solubilities in organic solvents, vary with the values of $x$, $y$ and $n$. This variation in solubility has been used to effect a preliminary separation of the above mentioned reaction product mixture into fractions each of which may comprise one or more species. Many fractions of varying solubility, but each corresponding to the above formula, have been separated from one overall reaction product. All of these fractions were found to be useful in one application, namely the stabilization of polyvinyl chloride plastics.

In practice it has been found unnecessary to separate the individual species since the mixtures produced in the overall reactions are in themselves useful for the stabilization of polyvinyl chloride plastics and for other purposes. For economy of manufacture, therefore, it is preferred to employ the mixed products, particularly those for which the value of $x$ in the above formula lies between 1 and 3, $y$ between 1 and 3, and $n$ between 1 and 7.

The particular values of $x$, $y$ and $n$ for the mixture produced in a given overall reaction depend upon the particular organotin oxide and the particular aldehyde used in the reaction, their relative proportion in the reaction mixture, and the time and temperature of reaction.

The compounds of the invention range from liquids to crystalline and amorphous solids, and, as described, they are prepared by reacting an organotin compound with an aldehyde. The organotin compound may be a dialkyl tin oxide in which the alkyl group may have a straight or branched chain and may include such groups as methyl, ethyl, propyl, butyl, isobutyl, amyl, isoamyl, hexyl, octyl, lauryl, cetyl, etc., and in which both alkyl groups of each particular oxide may be the same or different. Alkyl groups having between three and about 16 carbon atoms are preferred. The alkyl groups may be cyclic, such as cyclohexyl. The groups may be unsubstituted or substituted by such substituents as hydroxy, ester, carboxyl, halogen and equivalent radicals. Diaryl tin oxides and diaralkyl tin oxides are also useful for the reaction, the aryl and aralkyl groups in each such oxide being the same or different and including such aryl groups as phenyl, tolyl, xylyl, naphthyl, etc., and such aralkyl groups as benzyl, phenethyl, benzohydryl, etc. In addition, the aryl and aralkyl groups may be substituted by hydroxy, ester, carboxyl, halogen, alkoxy and other equivalent groups. Dialkenyl tin oxides, such as divinyl tin oxide, diallyl tin oxide, dicrotyl tin oxide, dipentenyl tin oxide, dicinnamyl tin oxide, etc. may serve as the organotin oxide. The organo groups of the latter may also be heterocyclic radicals such as furyl, furfuryl, thienyl, thenyl, pyridyl, piperidyl, etc. Alkynyl radicals such as ethynyl, propynyl, etc. may be the organo groups. As will be apparent, the organo groups of all of the foregoing organo tin oxides will furnish the $R^1$ and $R^2$ radicals in the general formula written above.

Suitable aldehydes for the reaction include aliphatic aldehydes like formaldehyde, acetaldehyde, propionaldehyde, butyraldehyde, 3-hydroxybutanal, isobutyraldehyde, valeraldehyde, 2-ethylbutanal, n-haptaldehyde, caprylaldehyde, 2-ethylhexanal, aldol of 2-ethylhexanal, acrolein, crotonaldehyde, 2-ethylhexenal, octadecenylaldehyde, propynal, etc.; aromatic aldehydes like benzaldehyde, salicylaldehyde, anisaldehyde, para and ortho tolualdehydes, para and ortho carbethoxybenzaldehydes, para and ortho nitrobenzaldehydes, etc.; aralkyl aldehydes like phenylacetaldehyde, cinnamaldehyde, etc.; and heterocyclic aldehydes like furfural. It is preferred to employ an aldehyde having a boiling point of at least 60° C. The value of the $R^3$ radical in the general formula will depend on the particular aldehyde used in the reaction. For example, if the aldehyde is acetaldehyde, $R^3$ will be methyl; if it is 2-ethylhexanal, $R^3$ will be (1-ethylpentyl). Formaldehyde is an exception to the general formula but is useful in the reaction.

The reaction may be carried out by simply bringing the organotin oxide and the aldehyde together in any suitable proportions. For practical reasons, a large excess of one reactant is to be avoided. In general, concentrations in which the organotin oxide may vary from 0.25 to 10 mols per mol of aldehyde are satisfactory. The reaction is preferably carried out at elevated temperatures ranging from about 50 to about 200° C., and, desirably, at 120–130° C. If a solvent for the reaction is employed, as is useful, it is advantageous to run the reaction at the boiling point of the solvent. Solvents like toluene, carbon tetrachloride, ether, hexane, heptane, etc. are suitable. Usually the solvent will dissolve the aldehyde, and the heated solvent will dissolve the reaction product, while the organotin oxide, which is generally a solid, remains undissolved. As the oxide reacts, however, it gradually disappears. The use of a solvent serves to keep the reactants stirred and also enables the course of the reaction to be followed more conveniently by the amount of oxide which is visible at any time. The reaction may also proceed below 50° C., and at room temperatures, although at a reduced rate. Thus one such reaction required 24 months to go to completion at room temperature. At elevated temperatures, the reaction has been carried out at times ranging from less than an hour to 2 to 3 days. The pressure during the reaction is preferably atmospheric, but it is possible to carry it out under higher pressures. Although the reaction product is generally soluble in the hot solvent, on cooling, it may be precipitated out and recovered.

The examples which follow may illustrate the preparation of various reaction products.

*Example 1*

One mol (248.7 grams) of dibutyl tin oxide is heated under reflux with 1 mol (128 grams) of 2-ethylhexanal in sufficient toluene to allow efficient stirring. After a period of several hours most of the dibutyl tin oxide is consumed in the reaction. The solution is filtered hot to remove unconverted oxide, and on cooling, crystals are deposited. Evaporation of the mother liquor yields a second crop of crystals which are different from the first crop in tin percentage, 30.9% tin as against 44.0% for the first crop.

*Example 2*

One mol (248.7 grams) of dibutyl tin oxide is heated under reflux with 4 mols of 2-ethylhexanal in toluene until the reaction is complete. Subsequent treatment is the same as in Example 1. An increase in the yield of the second product of 30.9% tin is obtained as against a decrease of the yield of the first product of 44% tin.

*Example 3*

One mol (288.7 grams) of diphenyl tin oxide is refluxed with 4 mols (288 grams) of butyraldehyde in toluene until the oxide disappears. Excess butyraldehyde is distilled out and the solution is filtered hot. Toluene is removed by distillation and the product is left as a solid.

*Example 4*

Dibutyltin oxide (0.25 mol; 62.2 gms.) was heated with 3-hydroxybutanal (1.00 mol; 88.1 gms.) in 200 ml. of toluene. The mixture was heated at reflux until it had cleared and water (which was removed) ceased to be evolved. Heating was continued for 4.5 hours after the solution cleared. The amount of water which distilled was 18.5 ml. The mixture was filtered hot, and the filtrate on cooling deposited fine crystals. Product weight, 65 gms.; tin analysis, 32.75%.

*Example 5*

One mol of propionaldehyde and 0.25 mol of dibutyltin oxide were heated in 200 ml. of toluene. After starting to reflux at 70° C., the mixture slowly evolved water. After 5 hours of refluxing, 4.3 ml. of water had been evolved. The solution then cleared; the temperature of the refluxing mixture being 95° C. After about 16 hours more heating, the temperature had reached 108.5° C. and 9.0 ml. of water had distilled. The solution was filtered cold and the filtrate was stripped of solvent. There was no low boiling aldehyde, only the dehydrated aldol, which was removed in the stripping step. The product weighed 72.4 gms. and contained 37.2% tin.

*Example 6*

Butyraldehyde (1 mol; 72.1 gms.) and dibutyltin oxide (0.25 mol; 62.2 gms.) were heated in 200 ml. of toluene until the solution cleared and water ceased to distill. The mixture became clear when the temperature reached 70° C. Refluxing began at 92° C. After 13.5 hours of refluxing the temperature had risen to 113.5° C. and 5.6 ml. of water had distilled out. The solution was filtered cold and the solvent was removed by vacuum distillation. No butyraldehyde was recovered, the excess aldehyde having formed aldol products with 2 to 4 butyraldehyde residues present, which products were removed in the vacuum distillation. The tin product weighed 91.6 gms.; tin content, 29.6%.

*Example 7*

Four mols of butyraldehyde and one mol of dibutyltin oxide were heated and stirred at reflux until the oxide was dissolved. The temperature of the refluxing mixture gradually rose from 73° C. to 146° C. over a period of about 5 hours; 23 ml. of water was evolved in this time. The mixture was cooled to 100° C. and an additional 83 gms. of oxide was added. Heat was then applied and the oxide dissolved in 27 minutes. Another 83 gms. of oxide was added, which on heating dissolved in 26 minutes. Then 82.7 gms. of oxide was added. (This corresponds to a total of 2 mols of oxide.) After this last portion had dissolved, 50 ml. of toluene was added to assist in distilling out water. The total amount of water evolved was 30.8 ml.; total refluxing time was 10 hours, 20 minutes. Toluene was added to the mixture and it was filtered hot. The filtrate on cooling deposited crystals which were filtered off (weight, 162.5 gms.; tin, 45.95%). The liquor remaining was vacuum distilled to remove solvent and aldehyde residue (no butyraldehyde was recovered). At a stripping temperature of 150° C. (0.9 mm. pressure) crystals began to appear in the condenser. These crystals (5.0 grams, approx.) analyzed 29.1% tin. The stripped liquor analyzed 36.5% tin.

*Example 8*

To four mols of butyraldehyde were added 3 gms. of sodium hydroxide in 15 ml. of water. An ice bath is used to cool the mixture during the exothermic reaction which follows such addition. As soon as the reaction subsided, heat and stirring were applied to remove water by distillation. When the temperature reached 93° C., 30 gms. of dibutyltin oxide was added. Similar portions of oxide (30 gms.) were added as soon as the previous portion had dissolved until a total of 270 gms. had been added. Following this, the oxide was added in portions of 50 gms. Toluene was added in small portions to maintain removal of water. After a total of 19 hours, 10 minutes, the temperature had risen to 162° C., 43.0 ml. of water had been removed, and 370 gms. of oxide had been added. The reaction mixture was allowed to reflux for 2 hours more, then filtered hot. On cooling the filtrate, a precipitate formed which weighed 151.5 gms. and contained 34.7% tin. The liquor remaining was vacuum distilled to produce 127 gms. of distillate and 309 gms. of residue, the latter containing 36.9% tin.

*Example 9*

Two mols of isobutyraldehyde and 0.5 mol of dibutyltin oxide were heated under reflux. The refluxing began when the mix temperature was 65° C. and slowly rose until at 95° C. (21 hours, 30 minutes of refluxing) the oxide was dissolved. Heating was continued for 3 hours more, the temperature rising to 101° C. No water was evolved in the reaction. The solution was filtered when it had cooled to 80° C. and excess aldehyde removed by vacuum distillation. Less than 10 ml. of isobutyraldehyde was found unreacted. The major part of the distillate was presumably aldols of isobutyraldehyde boiling from 57° to 108° C. at 7 mm. (vapor temperature). The stripped residue weighed 152.7 gms. and contained 30.7% tin. Theoretical tin for a product of dibutyltin oxide and the aldol of isobutyraldehyde is 30.4%.

*Example 10*

One mol of 2-ethylbutyraldehyde and 0.25 mol of dibutyltin oxide were heated at reflux for 7.5 hours until the oxide dissolved. Heating was continued for 6 hours further. The material was then diluted with 200 ml. of toluene and filtered hot. This filtrate was stripped by vacuum distillation, yielding a residue which crystallized on cooling. Product weight, 72.6 gms.; melting point, 101–114° C.; tin, 33.1%.

*Example 11*

One-quarter mol of dibutyltin oxide and 1.75 mols of n-heptaldehyde were heated at reflux until the oxide dissolved. Water which was evolved was separated by use of a Barrett water trap. The mixture began to reflux at 127.5° C. and after 25 minutes the temperature reached 165° C. The oxide was completely dissolved at this point. 9.6 ml. of water was evolved during this time. Heating was continued for 10 minutes and then 50 ml. of toluene was added to assist in removal of water. Four hours, fifty minutes later, 16.8 ml. of water had been removed. The mixture was cooled to room temperature and filtered. The remaining liquor was subjected to vacuum distillation, but the distillate fractions that were recovered were not heptaldehyde, as determined by refractive index measurements:

|  | Refractive index |
| --- | --- |
| n-Heptaldehyde | 1.410 at 21.5° C. |
| Fraction 1 | 1.480 at 21.5° C. |
| Fraction 2 | 1.451 at 21.5° C. |
| Fraction 3 | 1.455 at 22.0° C. |
| Fraction 4 | 1.466 at 22.0° C. |

The distillation residue weighed 117.6 gms. Tin analysis: 23.3% Sn.

*Example 12*

One-quarter mol of dibutyltin oxide, 0.25 mol of 2-ethylhexanal, 100 ml. of toluene and 10 ml. of water were heated at reflux temperature (100° C.) for 1.5 hours to the solution of the oxide. Water was then removed by azeotropic distillation and 200 ml. of toluene were added. The solution was refluxed for 2 hours further and filtered hot. Crystals were deposited on cooling the filtrate. These were filtered off: weight, 33.3 gms.; tin, 44.0%. The mother liquor was stripped by a downward atmospheric distillation (final temperature of strip 180° C.). The stripped residue deposited 26.3 gms. of crystals of 30.9% tin content. The final mother liquor contained 22.2% tin.

*Example 13*

One mol of 2-ethylhexanal, 0.25 mol of dibutyltin oxide and 200 ml. of toluene were refluxed at 123° C. for 5.25 hours until the oxide dissolved. A hundred ml. of toluene was added and the material was filtered. The filtrate was stripped by vacuum distillation, and the residue, on cooling, crystallized. Weight of crystals, 83.5 gms.; tin, 31.3%.

*Example 14*

One mol of 2-ethylhexanal and 0.5 mol of dibutyltin oxide were refluxed at 160° C. for 6.5 hours until the oxide dissolved. The solution was filtered hot and stripped by vacuum distillation. The product weighed 152.3 gms. and analysis showed 32.7% tin.

*Example 15*

One-quarter mol of dibutyltin oxide and 0.75 mol 2-ethylhexanal were refluxed at 159° C. for 3 hours to dissolve the oxide completely. The mixture was then filtered hot and stripped by vacuum distillation. Stripping was stopped when the pot temperature was 150° C. at 3 mm. pressure. The residue weighed 77.5 gms. and analyzed 33.6% tin.

*Example 16*

One mol of 2-ethylhexanal and 0.25 mol of dibutyltin oxide were heated until the oxide dissolved. This occurred after 1 hour, 48 minutes of heating and before refluxing started. The solution was refluxed at 156° C. for four more hours. Toluene (200 ml.) was added and the mixture was filtered hot. The filtrate was then stripped by vacuum distillation. Weight of the residue was 75.0 gms.; tin content was 31.0%.

Example 17

Four mols (995 gms.) of dry dibutyltin oxide, 12 mols (1540 gms.) of 2-ethylhexanal and 1330 gms. of toluene solvent were charged into a three-necked flask (standard taper joints) equipped with an anchor stirrer, thermometer, Barrett moisture trap, reflux condenser and Glas Col heating mantle. The reaction mixture was heated at reflux until the oxide dissolved. Some water was distilled. Heating at reflux (128° C.) was continued for 11 hours longer, and the mixture was then cooled to room temperature and filtered.

Stripping was done by downward distillation at atmospheric pressure, the mixture being stirred. Stripping was stopped when the batch temperature reached 179° C. The distillate amounted to 2045 ml.

The residue from stripping was aerated for 45 hours by slowly bubbling compressed air through it to effect crystallization. A few crystals separated.

Ethanol (500 ml.) was added to the mixture (about 1 liter) and the crystals redissolved. Acetone was then added to a total volume of four liters of solution, and a precipitate, identified as $LAC_1$, was thrown down, which was filtered off. The remaining filtrate, identified as liquor 1, was then diluted with 50 ml. of water, allowed to stand overnight, whereby a voluminous yellow precipitate 1 was formed which was filtered, the remaining filtrate being identified as liquor 2. To liquor 2 there was added 100 ml. of water, the mixture allowed to stand overnight, and a colorless precipitate 2 was formed which was filtered off.

The precipitate $LAC_1$ was dissolved in hot acetone and on cooling a precipitate $LAC_1R_1$ (146.6 gms.) was deposited.

Precipitate 1 was extracted with 2 liters of hot acetone, there being formed as a result of this step a solution and an insoluble residue, the latter being separated. The solution, on cooling, deposited 154.0 gms. of crystals identified as $LAC_2$. These crystals were filtered off, and the remaining filtrate or liquor was stripped of acetone to yield an oil, $LAC_{22}$, which was then vacuum stripped to yield 50–60 ml. of a liquid distillate and a residue. This residue, on cooling, deposited crystals, $LAC_{22}$, which were recrystallized from acetone, in which they were soluble, to yield 97.7 gms. of crystals, $LAC_{22}R_1$.

Precipitate 2 was dissolved in a large volume of hot acetone, and the solution on cooling deposited a solid, $LAC_3$, which was separated. The latter was recrystallized from hot acetone to yield a precipitate insoluble in hot acetone, which was separated, and on cooling of the hot acetone solution there was deposited 97.9 gms. of solid material, $LAC_3R_1$, which was recovered.

By similar procedures the original mixed product was eventually separated into 25 fractions. All but one of the fractions were white.

Analyses of the fractions are given in the following table. Molecular weights were determined by boiling point elevation of a benzene solution of the products except those values marked with an asterisk, which were done cryoscopically in camphor.

| Fraction or Sample | Percent Tin | Percent C | Percent H | Mol. Wt. | Melting Points, °C.— | |
|---|---|---|---|---|---|---|
| | | | | | Softening | Melting |
| $LAC_1R_1$ | 33.3 | 47.76 | 8.31 | 1,779 | 98.2 | 99.8–103 |
| $LAC_{12}R_2$ | 29.02 | 37.48 | 6.46 | 1,774 | 82.7 | 90.5–96.5 |
| $Ppt_1RS_1$ | 51.92 | 22.45 | 4.49 | | | not melted at 235 |
| $Ppt_1RSC_1$ | 33.1 | 31.9 | 5.68 | | | |
| $LAC_2$ | 32.98 | 47.89 | 8.58 | 1,577 | 94.5 | 95–100 |
| $LAC_{22}R_1$ | 30.3 | 39.23 | 6.83 | 1,082 | 103 | 107.5–110 |
| $LAC_{22}R_2$ | 21.4 | 58.2 | 10.3 | 303* | | |
| $LAC_{21}R_1$ | 30.0 | 36.78 | 6.71 | 1,067 | | |
| $LAC_{23}R_2$ | 24.1 | 40.23 | 7.67 | 543* | | |
| $LAC_{23}F$ | 20.3 | 58.7 | 10.6 | 404 | | |
| $LAC_{22}D$ | 0.72 | | | | | |
| $LAC_3R_1$ | 33.63 | 47.2 | 8.42 | 1,799 | 97.8 | 99.2–104 |
| $LAC_3R_2$ | 30.69 | 49.8 | 8.80 | 422.4* | 72 | 81.8–102 |
| $LAC_3ppt$ | 55.6 | 18.31 | 4.29 | | | chars at 238 |
| $LAC_{32}$ | 29.35 | 38.43 | 6.70 | 796 | 89 | 91.5–105 |
| $LAC_4$ | 33.75 | 47.47 | 8.37 | 1,719 | 98.0 | 98.5–103 |
| $LAC_{42}$ | 27.98 | 51.14 | 8.86 | | 70.3 | 83.2–86 |
| $LAF_tBC_1$ | 26.95 | 54.37 | 8.74 | | 39.5 | 40–42 |
| $LAF_tTC_1$ | 27.45 | 55.59 | 9.50 | 408.4 | | |
| $K_1$ | 27.58 | 55.34 | 9.77 | 433.9 | 44 | 45–46 |
| $K_2$ | 27.35 | 55.17 | 10.02 | 476.4 | 42 | 44–45 |
| $K_3$ | | | | 493.8 | 39.9 | 41–43.5 |
| $LAF_tTC_3$ | 30.4 | 50.55 | 8.71 | 536* | | |
| $LAF_tTC_3F$ | 21.8 | 58.4 | 10.1 | | | |
| $J$ | 4.85 | | | | | |

Example 18

One-quarter mol (62.2 gms.) of dibutyltin axoide and 0.75 mol (192 gms.) of the aldol of 2-ethylhexanal were heated together. After 8 minutes of heating the temperature reached 77° C. and the oxide had completely dissolved. A few ml. of toluene were added to aid in removal of water, and heating was continued for 1 hour, 52 minutes to a temperature of 158° C. The mixture was then filtered and stripped by vacuum distillation to a pot temperature of 160° C. at 2 mm. pressure. The residue weighed 117 gms.; tin content, 22.67%; and the molecular weight (camphor method) was 554.

Example 19

One-half mol (124.4 gms.) of dibutyltin oxide, 0.25 mol (64.0 gms.) of the aldol of 2-ethylhexanal, and 100 ml. of toluene were heated on a steam bath. At 97° C., 41 minutes after starting to heat, the oxide was completely dissolved. The solution was filtered immediately and the filtrate was evaporated for several hours until free of toluene. Product was crystalline; weight 187.3 gms. (theory, 188.4 gms.); per cent tin, 31.26 (theory, 31.5); molecular weight, 1183.

Example 20

Fifty gms. of dibutyltin oxide mixed with 30–40% water was added to 100 ml. of boiling water. After 5 minutes slurrying of the oxide, 62 gms. of 2-ethylhexanal were added. A white gummy phase immiscible with water was formed. After an hour's heating at 95–103° C., the oxide dissolved completely in the aldehyde and the water separated into a lower layer. Much of the excess aldehyde was lost through evaporation. Cooling the batch caused crystals to separate; these were filtered off, air dried, and found to contain 30.2% tin.

*Example 21*

One mol of distilled cinnamaldehyde, 0.25 mol dibutyltin oxide, 5.0 gms. of aldol of 2-ethylhexanal (used as a catalyst) and 100 ml. of toluene were heated at reflux until the oxide had dissolved. The solution was filtered hot. However it cooled sufficiently during filtration to deposit a large amount of precipitate containing 24.1% tin. The filtrate on vacuum stripping yielded a small amount of crystals (26.5% tin).

*Example 22*

One mol of 2-ethylhexanal, 0.25 mol of dibutyltin oxide and 200 ml. toluene were heated at reflux until the oxide dissolved and for 6 hours more. The solution was filtered hot, then filtered cold to remove a cold-insoluble portion, and vacuum stripped. The cold-insoluble material (weight 13.0 gms.) contained 42.6% tin. The distillation residue, weighing 57.5 gms., contained 35.2% tin.

*Example 23*

One-quarter mol of octadecenylaldehyde, 0.25 mol of dibutyltin oxide and 200 ml. of toluene were heated at reflux until the oxide dissolved (this required 28.5 hours). The solution was filtered hot and the filtrate cooled. A precipitate which formed was filtered off; weight, 44.5 gms., 29.45% tin. The filtrate was vacuum stripped yielding a residue; weight, 48 gms., 23.0% tin.

*Example 24*

One mol of benzaldehyde, 0.25 mol of dibutyltin oxide and 200 ml. of toluene were heated at reflux until the oxide dissolved. The solution was filtered hot and vacuum stripped. The product was a viscous liquid weighing 80.3 gms. Analysis: 34.6% tin.

*Example 25*

One-quarter mol of dibutyltin oxide, 0.25 mol salicylaldehyde and 200 ml. of toluene were heated at reflux until the oxide dissolved. The solution was filtered hot and vacuum stripped. The product, on cooling, hardens to a glassy resin. Product weight was 63.5 gms. and contained 35.1% tin.

*Example 26*

One mol of furfural, 0.25 mol of dibutyltin oxide and 200 ml. of toluene were heated and stirred at reflux (118–120° C.) for 27.33 hours and then filtered hot. A product which was insoluble in hot toluene was obtained (weight 28.3 gms., 42.6% tin). On cooling the filtrate a second product was obtained (24.0 gms., 43.7% tin). A final product was obtained by vacuum stripping the last filtrate (13.0 gms., 35.4% tin).

*Example 27*

One mol of butyraldehyde and 0.27 mol of dimethyltin oxide were heated and stirred at reflux for 51 hours (reflux temperature rose from 75° C. to 154° C.). An insoluble material was obtained as a filter cake on filtering hot. This material weighed 20.5 gms. and analyzed 59.4% tin. The filtrate was vacuum stripped to yield a few gms. of residue, 38.52% tin.

*Example 28*

One mol of 2-ethylhexanal, 0.25 mol of dimethyltin oxide and 200 ml. of toluene were heated and stirred at reflux (122° C.) until the oxide dissolved (33.33 hours). The mixture was filtered cold and stripped by vacuum distillation. The residue crystallized out yielding 51.5 gms. of crystals (32.5% tin) and 20 gms. of liquid (20.7% tin). Molecular weight of the crystalline product was 423 as determined by the Rast camphor method.

*Example 29*

One mol of 2-ethylhexanal and 0.25 mol of dimethyltin oxide were heated and stirred at 160° C. for 45.5 hours. An insoluble product was filtered off (after dilution with 100 ml. of toluene). This product contained 45.2% tin. The filtrate was vacuum distilled to yield several distillation fractions, the last of which weighed 25.2 gms and contained 9.8% tin, and a residue which weighed 23.5 gms. and contained 24.6% tin.

*Example 30*

Two mols of 2-ethylhexanal, 0.25 mol of diphenyltin oxide and 100 ml. of toluene were heated and stirred at reflux (130–140° C.) for 18.5 hours, at which time solution of the oxide occurred. Heating was continued for 5 hours longer. The solution was then filtered hot and allowed to cool. A large deposit of white crystals resulted and was filtered off (weight 64.0 gms.; tin, 30.1%). The mother liquor was evaporated and a further deposit of 3 gms. was recovered.

*Example 31*

Two mols of benzaldehyde, 0.25 mol of diphenyltin oxide and 50 ml. of toluene were heated and stirred at reflux (140–145° C.) for about 30 hours. The material was filtered hot to remove an insoluble precipitate (weight 142.5 gms.; 21.5% tin). On cooling, the filtrate deposited 1.5 gms. of crystals, 22.8% tin. Evaporation of the final filtrate yielded crystals weighing 27.5 gms. and analyzing 9.4% tin.

*Example 32*

One mol of 2-ethylhexanal, 0.25 mol of dilauryltin oxide and 200 ml. of toluene were heated and stirred at reflux (120–125° C.) until there was no precipitate obtained on cooling a sample. The material was then allowed to cool to room temperature, filtered, and vacuum stripped. The product weighed 100.4 gms., 18.9% tin.

The compounds prepared as above described have been found to be useful as stabilizers for organic materials containing chlorine or other halogen, such as vinyl resins containing polymerized vinyl chloride, chlorinated paraffins containing from 10 to 40 carbon atoms per molecule, chlorinated stearates, chlorinated biphenyls, dichlorodiphenyltrichloroethane (DDT), chlorinated rubber, and other preferably high molecular weight halogenated material. As is known, such material has a tendency to deteriorate, especially during heating, and is thus rendered unfit for service. Usually the deterioration is manifested by a widespread discoloration of the material. The compounds produced as described are effective for inhibiting the deterioration and discoloration of the foregoing halogenated materials. By adding from about 0.1 to about 10% of such compounds to the material to be stabilized, a composition is obtained which is greatly improved in stability by comparison with the unstabilized material. Compounds of lower tin content are particularly effective as stabilizers. The following examples may illustrate the preparation of such compositions.

Example 33

On a weight basis, 98 parts of polyvinyl chloride was stirred into a mixture of 60 parts butyl benzyl phthalate and 10 parts of tricresyl phosphate as plasticizers, and 2 parts of the product of Example 1 having 30.9% tin, until a homogeneous dispersion was secured. Similarly, a second or control dispersion was prepared containing no organotin compound. A third composition containing 2 parts of dibutyl tin maleate as the tin compound was also prepared. Samples of these compositions were placed in the cavities of molds, the cavities being in the shape of strips 1" by 6" by 0.05". The molds were then placed in an oven at 185° C., the temperatures of the molds being gauged by thermocouples placed in borings in the molds. In one series of tests the molded strips were withdrawn from the oven when their temperatures reached 185° C. The control composition was deep red in color, that containing dibutyl tin maleate was light yellow, and that containing the product from Example 1 was colorless. A second series of tests was carried out in which the molds were allowed to remain at 185° C. for 30 minutes. In this series the control was very dark reddish in color, the molded strip containing dibutyl tin maleate was light tan, and the strip with the product from Example 1 was colorless. A third series of tests was carried out at 195° C. for 45 minutes, and in this case the control strip was nearly black, the strip containing the maleate was dark orange with reddish streaks, while the strip containing the product from Example 1 was yellowish.

Example 34

A composition was prepared containing 95 parts by weight of a polyvinyl resin consisting of 85% vinyl chloride and 15% vinyl acetate, 47.5 parts by weight of dioctyl phthalate as the plasticizer, and 5 parts of the tin product from Example 3. The above mixture was compounded on a differential speed roll mill at 160–165° C. for 5 minutes and removed as sheeting. A control composition was made in the same way with the exception that no organotin compound was used. A third composition containing dibutyl tin maleate as the organotin compound was prepared in the same way.

Uniform strips were prepared from samples of these three compositions by molding at a pressure of 2000 p. s. i. between the platens of a hot press utilizing molds which formed strips 6" by 1" by 0.05". The molds were heated at a temperature of 180° C. for a period of 30 minutes in order to determine discolloration in the strips. The control composition yielded a strip which was badly discolored, being a deep reddish. The composition containing dibutyl tin maleate was yellow to tan, while the composition containing the compound from Example 3 was colorless.

Example 35

To three mixtures of 100 parts by weight of vinyl chloride resin and 50 parts by weight of di-2-ethylhexyl phthalate plasticizer were added 1, 2 and 3 parts (corresponding to 1, 2, and 3% by weight of the resin, respectively) of compound $LAC_1R_1$ of Example 17. Each of the mixtures were then milled for 5 minutes at 320–325° F. on a 2-roll differential speed mill. The milled sheets were each placed in a single cavity mold (6" x 6" x 40 mils) preheated to 275° F. The mold was then put on a Preco press and raised to 320° F. under 10,000 lbs. total pressure. When the mold reached 320° F. the pressure was increased to 40,000 lbs. and held until the temperature reached 330° F. This procedure required 5 to 5.5 minutes. The mold and press platens were then cooled and the pressed sheet removed.

These pressed sheets were cut into strips 1" x 6" and placed in clips on a tray so that they would hang vertically. They were placed in a circulating air oven (at 320° F.) and allowed to remain at this temperature, samples being removed at 1 hour, 2 hours, 3 hours and 4 hours.

Samples containing 1% of $LAC_1R_1$ were discolored after 3 hours of heat aging. Those with 2 and 3% were very slightly discolored after 4 hours of aging. A plastic sheet made by the same procedure from the same ingredients but omitting the compound $LAC_1R_1$ was discolored after the pressing operation and very badly discolored after 1 hour of heat aging.

Example 36

The procedure described in Example 35 was repeated using 1, 2 and 3 parts of compound $LAC_2$ from Example 17. The sample containing 1 part of $LAC_2$ was slightly discolored after 3 hours, badly discolored after 4 hours at 320° F. Samples containing 2 and 3 parts of $LAC_2$ were slightly discolored after 4 hours at 320° F.

Example 37

The procedure of Example 35 was repeated using as the stabilizer $LAC_3R_1$ from Example 17. Samples containing 2 and 3 parts of stabilizer were very slightly discolored after 4 hours at 320° F., while the sample containing 1 part was badly discolored on the edges only, after 4 hours.

Example 38

Vinyl chloride resin (200 parts), di-2-ethylhexyl phthalate (100 parts), and $LAC_{22}R_1$ (2.5 parts) from Example 17 were processed as described in Example 35. This sample went 3 hours without serious discoloration, discoloring badly however after 4 hours at 320° F.

Example 39

To 100 parts of vinyl chloride resin and di-2-ethylhexyl phthalate was added 1 part of $LAC_1R_1$ from Example 17. This mixture was milled for 5 minutes at 320–325° F. on a 2-roll differential speed mill. The milled sheet was pressed at 320° F. between two chrome plated sheets of steel on a Preco press at 40,000 lbs. total pressure to form a sheet 4 to 6 mils thick. The sheet was cut to fit Mask No. SL–8A and placed in an Atlas Electric Devices Company fadeometer.

$LAC_2$ and $LAC_3R_1$ from Example 17 were also tested as light stabilizers in the same manner. $LAC_1R_1$ and $LAC_2$ withstood ultraviolet light in the fadeometer for 305 hours with very slight discoloration and very slight embrittlement of the film. $LAC_3R_1$ was very slightly discolored, but somewhat embrittled after 305 hours in the fadeometer.

Example 40

The procedure of Example 35 was repeated using as stabilizer the product from Example 24. Samples containing 2 and 3 parts of stabilizer were very slightly colored after 4 hours at 320° F. That containing 1 part was discolored on the edges.

*Example 41*

A 4 to 6 mil sheet was prepared as in Example 39 using 2 parts of the product from Example 24 as stabilizer. This film withstood over 700 hours in the fadeometer.

*Example 42*

Following the procedure of Example 35, a sample containing 2 parts of the product from Example 6 per 100 parts of vinyl chloride resin was prepared and tested. After 4 hours at 320° F. it was very slightly discolored.

*Example 43*

A sample containing 2 parts of the crystalline product from Example 28 per 100 parts of vinyl chloride resin was prepared and tested by the procedure of Example 35. This sample was slightly discolored after 3 hours at 320° F.

*Example 44*

Two parts of the product from Example 30, 100 parts of vinyl chloride resin and 40 parts of di-2-ethylhexyl phthalate were processed and tested as described in Example 35. This sample withstood 3 hours of heat aging at 320° F.

Although the invention has been described in connection with selected embodiments thereof, it will be appreciated that it is capable of obvious variations without departing from its scope.

This application is a continuation-in-part of co-pending application Serial Number 84,756, filed March 31, 1949.

In the light of the foregoing description, the following is claimed:

1. The reaction product of 0.25 to 10 mols of an organotin oxide with 1 mol of an aldehyde, said organotin oxide having two organo groups connected to the tin atom.

2. The reaction product of 0.25 to 10 mols of an organotin oxide with 1 mol of an aldehyde, said organotin oxide having two organo groups connected to the tin atom, said organo groups of the organotin oxide being radicals selected from the class consisting of substituted and unsubstituted alkyl, alkenyl, alkynyl, aryl, aralkyl and heterocyclic radicals.

3. An organotin compound having the formula $[(R^1R^2SnO)_x(R^3CHO)_y]_n$, in which $R^1$, $R^2$ and $R^3$ are radicals selected from the group consisting of substituted and unsubstituted alkyl, alkenyl, alkynyl, aryl, aralkyl and heterocyclic radicals, $x$ is a number varying between 1 and 10, $y$ is a number varying between 1 and 6, and $n$ is a number varying between 1 and 7.

4. An organotin compound having the formula $[(R^1R^2SnO)_x(R^3CHO)_y]_n$, in which $R^1$ and $R^2$ are alkyl radicals and $R^3$ is an aryl radical, $x$ is a number varying between 1 and 10, $y$ is a number varying between 1 and 6, and $n$ is a number varying between 1 and 7.

5. An organotin compound having the formula $[(R^1R^2SnO)_x(R^3CHO)_y]_n$, in which $R^1$, $R^2$ and $R^3$ are alkyl radicals, $x$ is a number varying between 1 and 10, $y$ is a number varying between 1 and 6, and $n$ is a number varying between 1 and 7.

6. An organotin compound having the formula $[(R^1R^2SnO)_x(R^3CHO)_y]_n$, in which $R^1$ and $R^2$ are aryl radicals and $R^3$ is an alkyl radical, $x$ is a number varying between 1 and 10, $y$ is a number varying between 1 and 6, and $n$ is a number varying between 1 and 7.

7. An organotin compound having the formula $[(R^1R^2SnO)_x(R^3CHO)_y]_n$, in which $R^1$, $R^2$ and $R^3$ are aryl radicals, $x$ is a number varying between 1 and 10, $y$ is a number varying between 1 and 6, and $n$ is a number varying between 1 and 7.

8. An organotin compound having the formula $[(R^1R^2SnO)_x(R^3CHO)_y]_n$, in which $R^1$ and $R^2$ are alkyl radicals and $R^3$ is a heterocyclic radical, $x$ is a number varying between 1 and 10, $y$ is a number varying between 1 and 6, and $n$ is a number varying between 1 and 7.

9. An organic, halogen-containing material having incorporated therein from about 0.1 to about 10% by weight of the product of claim 1.

10. An organic, halogen-containing material having incorporated therein from about 0.1 to about 10% by weight of the product of claim 2.

11. A stabilized chlorine-containing resinous composition incorporating about 0.1 to about 10% by weight of the product of claim 1.

12. A stabilized plasticized, vinyl resin composition comprising polymerized vinyl halide, said resin having incorporated therein from about 0.1 to about 10% by weight of the product of claim 1.

13. A stabilized composition comprising a chlorinated paraffin having from 10 to 40 carbon atoms per molecule and the product of claim 1.

JAMES M. CHURCH.
ERNEST W. JOHNSON.
HUGH E. RAMSDEN.

REFERENCES CITED

The following references are of record in the file of this patent:

UNITED STATES PATENTS

| Number | Name | Date |
| --- | --- | --- |
| 2,047,191 | Buc et al. | July 14, 1936 |
| 2,252,665 | Reiff et al. | Aug. 12, 1941 |
| 2,431,038 | Harris | Nov. 18, 1947 |
| 2,476,422 | Leininger | July 19, 1949 |
| 2,481,086 | Cleverdon et al. | Sept. 6, 1949 |